Aug. 11, 1931.  L. F. BLUME  1,818,785
TEMPERATURE INDICATOR FOR ELECTRICAL APPARATUS
Filed Aug. 11, 1930
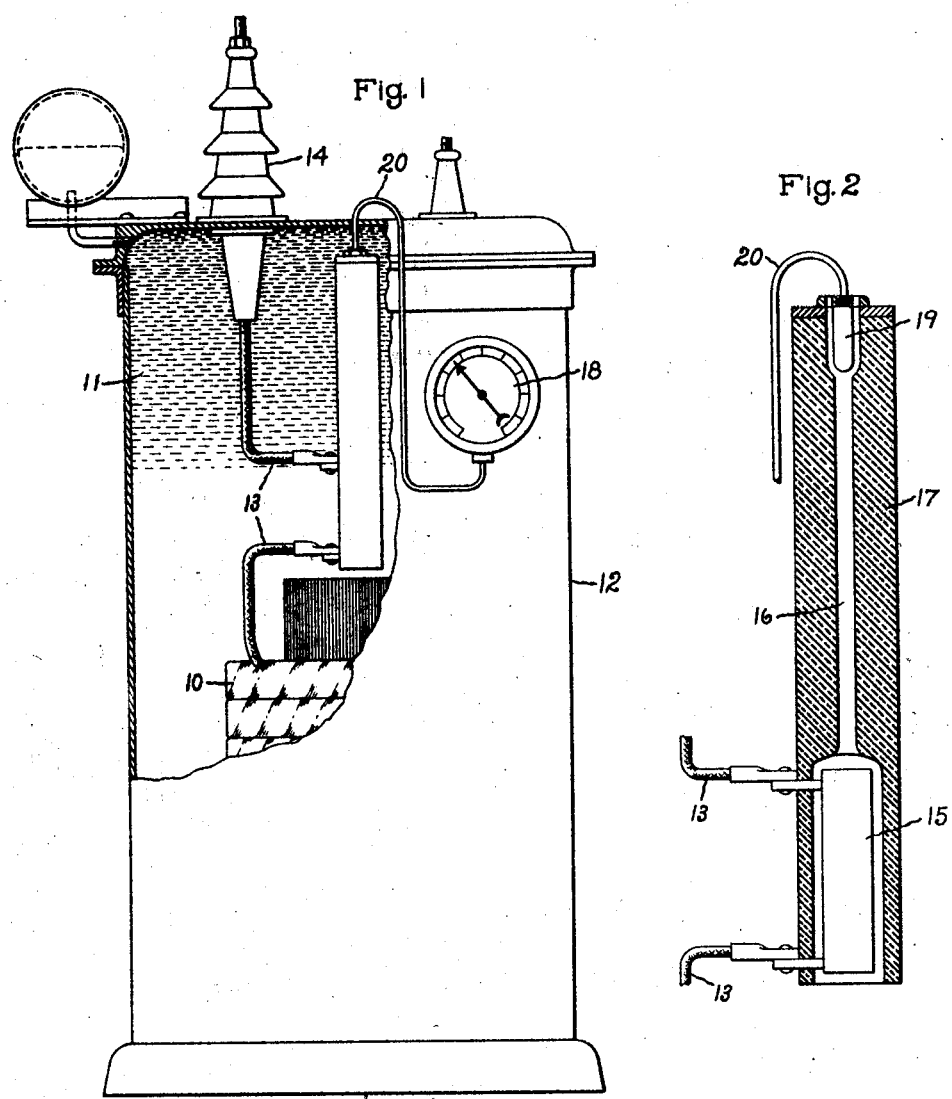
Inventor:
Louis F. Blume,
by Charles E. Mullan
His Attorney.

Patented Aug. 11, 1931

1,818,785

UNITED STATES PATENT OFFICE

LOUIS F. BLUME, OF PITTSFIELD, MASSACHUSETTS, ASSIGNOR TO GENERAL ELECTRIC COMPANY, A CORPORATION OF NEW YORK

TEMPERATURE INDICATOR FOR ELECTRICAL APPARATUS

Application filed August 11, 1930. Serial No. 474,537.

My invention relates to temperature indicators for electrical apparatus and more particularly for electrical apparatus such as a transformer or reactor which is immersed in a body of insulating and cooling liquid. The load capacity of a transformer, reactor or other electrical apparatus having current carrying windings is limited by temperature conditions in the apparatus, the maximum safe load being reached when any part of the apparatus reaches its maximum safe temperature. The part which first reaches its maximum safe temperature as the load is increased is sometimes called the hot spot and it is often some part of the winding and its insulation. It is therefore often desirable or important to know the temperature of the hot spot so as to be able to operate the apparatus at full capacity but without overloading it with consequent injury and shortening of its life. The general object of the invention is to provide an improved temperature indicator for this purpose.

The invention and its advantages will be better understood from the following description taken in connection with the accompanying drawing in which Fig. 1 is a view of an oil immersed transformer provided with a temperature indicator arranged in accordance with the invention, part of the transformer casing being broken away, and Fig. 2 is an enlarged sectional view of part of the indicator.

Like reference characters indicate similar parts in both figures of the drawings.

The invention is shown in the drawings as applied to a transformer 10 which is immersed in a body of insulating and cooling liquid 11 in a casing 12. One of the windings of the transformer has a lead 13, shown in Fig. 1 as a lead of the high voltage winding, which extends through a bushing 14 in the cover of the casing 12 for connection to an external circuit. A resistance 15, shown in Fig. 2, is connected in series with the transformer lead 13 from the high voltage winding. The resistance 15 is located in the lower end of an opening or passageway 16 extending longitudinally through a vertical tube 17, the lower end of the opening 16 being preferably enlarged as shown in Fig. 2 to receive the resistance.

The insulating liquid 11 is heated by the transformer, flowing upwardly by convection along and through the heated surfaces and ducts of the transformer where it absorbs the heat and returning downwardly along the walls of the casing 12 where it gives up the heat which is finally dissipated into the surrounding air. The tube 17 is supported in the insulating liquid 11 in such position that there will be a continual flow of some of the heated liquid from the transformer through the opening 16 in the tube and past the resistance 15. The best position of the tube 17 is usually above the transformer or other apparatus with which it is used, the end of the tube which contains the resistance 15 being close to the apparatus where it will receive some of the heated liquid before the liquid can become cooled at all. The tube then extends upwardly and preferably vertically so that the heated liquid will flow through the tube readily by convection. The tube is formed of material which has good heat insulating properties so that any liquid flowing through the tube will not lose any of its heat and its temperature will remain substantially unchanged.

The whole body of insulating liquid 11 becomes heated when the transformer is in operation. The temperature of the hot spot in the transformer, however, is higher than that of the hottest liquid leaving the transformer, the difference increasing as the load on the transformer is increased. The resistance 15 is heated by the current from the high voltage winding of the transformer and this current is proportional to the current in the low voltage winding. The heating of the transformer and the heating of the resistance 15 are therefore proportional. The temperature of the liquid in the tube 17 after it leaves the resistance 15 is affected by the rate at which the liquid flows through the tube and the rate at which heat is given up to it by the resistance. The resistance is of such value that the heat produced by the current flowing through it raises the temperature of the liquid in the tube 17 to that of the hot spot in the transformer.

A temperature indicator 18, mounted in any convenient place, is controlled by a temperature responsive element 19 at the upper end of the opening 16 in the tube 17. The element 19 is shown as a thermometer bulb connected by a capillary tube 20 to the indicator 18 but other forms of indicating devices may be used if desired. After the liquid, heated to the temperature of the hot spot in the transformer, leaves the resistance 15, it flows substantially without loss of heat or change of temperature through the opening 16 in the tube 17 and past the element 19 which it maintains at the temperature of the hot spot. The indicator 18 thus shows the temperature of the hot spot. The tube 17 is formed of material which has good electrical as well as heat insulating properties. Thus, the element 19 and the temperature indicator 18 are well insulated from the resistance 15 and the high voltage circuit of the transformer.

The invention has been explained by describing and illustrating one arrangement and application thereof but it will be apparent that changes may be made without departing from the spirit of the invention or the scope of the appended claims.

What I claim as new and desire to secure by Letters Patent of the United States is:

1. The combination with electrical apparatus immersed in an insulating liquid of a temperature indicator having a temperature responsive element, means for heating a portion of said liquid to the temperature of an internal part of said apparatus, and means for conducting said heated portion of the liquid to said temperature responsive element without substantial temperature change.

2. The combination with electrical apparatus immersed in an insulating liquid of a temperature indicator having a temperature responsive element, means for heating a portion of said liquid to the temperature of an internal part of said apparatus, and a tube of heat insulating material for conducting said heated portion of the liquid to said temperature responsive element.

3. The combination with electrical apparatus immersed in an insulating liquid of a temperature indicator having a temperature responsive element, a resistance adapted to be heated in response to a current in said apparatus, and means for conducting a portion of said liquid from said resistance to said temperature responsive element without substantial temperature change.

4. The combination with electrical apparatus immersed in an insulating liquid of a temperature indicator having a temperature responsive element, a resistance adapted to be heated in response to a current in said apparatus, and a tube of electrical and heat insulating material, said resistance and temperature responsive element being located at opposite ends of said tube, and said tube extending upwardly from said resistance to conduct liquid heated by the resistance to the temperature responsive element.

In witness whereof I have hereunto set my hand this 5th day of August, 1930.

LOUIS F. BLUME.